(12) United States Patent  (10) Patent No.: US 8,762,640 B2
Mosek et al.  (45) Date of Patent: *Jun. 24, 2014

(54) METHOD FOR OPERATING A MEMORY INTERFACE WITH SIM FUNCTIONS

(75) Inventors: Amir Mosek, Tel Aviv (IL); Yuval Sofer, Bellevue, WA (US)

(73) Assignee: SanDisk IL Ltd., Kfar Saba (IL)

( * ) Notice: Subject to any disclaimer, the term of this patent is extended or adjusted under 35 U.S.C. 154(b) by 766 days.

This patent is subject to a terminal disclaimer.

(21) Appl. No.: 12/137,198

(22) Filed: Jun. 11, 2008

(65) Prior Publication Data

US 2009/0006748 A1 Jan. 1, 2009

Related U.S. Application Data

(60) Provisional application No. 60/937,631, filed on Jun. 27, 2007.

(51) Int. Cl.
*G06F 13/00* (2006.01)
*G06F 13/28* (2006.01)

(52) U.S. Cl.
USPC ............... 711/115; 711/E12.001; 710/72

(58) Field of Classification Search
USPC ............... 711/115, E12.001; 710/72
See application file for complete search history.

(56) References Cited

U.S. PATENT DOCUMENTS

| 7,305,535 | B2 | 12/2007 | Harari et al. | |
|---|---|---|---|---|
| 7,572,152 | B2* | 8/2009 | Mosek et al. | 439/631 |
| 2004/0064612 | A1 | 4/2004 | Pinto et al. | |
| 2004/0103234 | A1* | 5/2004 | Zer et al. | 710/301 |
| 2004/0210715 | A1* | 10/2004 | Harari et al. | 711/115 |
| 2007/0180538 | A1* | 8/2007 | Kravitz et al. | 726/33 |
| 2011/0133998 | A1* | 6/2011 | Hobson et al. | 343/702 |

OTHER PUBLICATIONS http://www.webopedia.com/DidYouKnow/Computer_Science/2007/Memory_card_types.asp, Different Types of Memory Cards, Beal, Vangie.*

* cited by examiner

*Primary Examiner* — Edward Dudek, Jr.
(74) *Attorney, Agent, or Firm* — Brinks Gilson & Lione

(57) ABSTRACT

A method for operating a host device includes inserting a plug-in adapter, having a subscriber identity module (SIM) component disposed thereon, into a host receptacle of the host device. A memory card is inserted into a memory receptacle on the plug-in adapter. After inserting the plug-in adapter and the memory card, communications are conveyed between the host device and the SIM component via the adapter and the memory card.

9 Claims, 4 Drawing Sheets

METHOD FOR OPERATING A MEMORY INTERFACE WITH SIM FUNCTIONS

CROSS-REFERENCE TO RELATED APPLICATION

This application claims the benefit of U.S. Provisional Patent Application 60/937,631, filed Jun. 27, 2007, which is incorporated herein by reference. This application is related to a U.S. patent application entitled "Memory Interface Card with SIM Functions," filed on even date.

FIELD OF THE DISCLOSURE

The present invention relates generally to computing and communication devices, and specifically to device authentication.

BACKGROUND OF THE DISCLOSURE

Electronic memory cards are commonly used for non-volatile storage of digital data in many electronic computing and communication devices. A variety of different card formats are available from various suppliers, such as SanDisk Corporation (Sunnyvale, Calif.). SanDisk, for example, offers Secure Digital (SD™) cards, as well as smaller microSD™ cards, which are designed to be plugged into a compatible receptacle in a host device. Such cards contain flash memory and an embedded processor, which communicates with the host processor using a predefined bus protocol (such as the SD protocol).

A subscriber identity module (SIM) is a type of smart card that is used for authentication of a host device in which the SIM is installed, based on a unique identifier that is stored securely in the SIM. The SIM may also include a memory (such as flash memory or other non-volatile memory) for storing data. The term "SIM card" originally came into use in the specific context of authenticating mobile telephones in Global System for Mobile (GSM) telephone networks, but has now come to refer to any smart card or other electronic component that securely stores a unique identifier for purposes of authentication. In the context of the present patent application, the term "SIM component" is used in this broad sense. For purposes of authentication, SIM components commonly communicate with the host processor using a predefined SIM protocol, such as the ISO 7816 protocol defined by the International Organization for Standardization.

SUMMARY OF THE DISCLOSURE

In some embodiments, a plug-in adapter includes a first contact for connection to a host device, at least two second contacts for connection to a memory card, a third contact for connection to a subscriber identity module (SIM) component, and circuitry that connects at least one of the second contacts to the third contact and connects at least another of the second contacts to the first contact so as to create a communication path between the host device and the SIM component via the memory card.

The adapter may include a connector containing the first contact and configured to mate with a host receptacle in the host device, wherein the connector may be compatible with an SD card standard. Typically, the connector is configured to permit the adapter to be removed from the host device. Additionally or alternatively, the adapter may include a memory receptacle, which contains the second contacts, for receiving the memory card, wherein the memory receptacle may be compatible with a microSD card standard.

In one embodiment, the circuitry is configured to enable the host device to communicate with the SIM component via the memory card in accordance with an ISO 7816 standard. Additionally or alternatively, the at least one of the second contacts is configured to communicate with an antenna connection of the memory card.

The third contact may be fixedly connected to the SIM component. Alternatively, the adapter may include a SIM receptacle containing the third contact and configured to removably receive the SIM component.

Another embodiment provides computing apparatus, including a host device including a host receptacle compliant with a first memory card standard, a memory card compliant with a second memory card standard, and a plug-in adapter. The adapter includes a connector configured to mate with the host receptacle and containing a first contact for connection to the host device and a memory receptacle configured to receive the memory card and containing at least two second contacts for connection to the memory card, as well as a third contact for connection to a subscriber identity module (SIM) component. Circuitry in the adapter connects at least one of the second contacts to the third contact and connects at least another of the second contacts to the first contact so as to create a communication path between the host device and the SIM component via the memory card.

The circuitry and memory card may be configured to enable the host device to communicate with the SIM component by exchanging messages via the memory card in accordance with an ISO 7816 standard, wherein the messages are encapsulated for transmission between the host device and the memory card in accordance with the first card standard, and wherein the memory card comprises a processor, which is configured to parse and convey the messages to and from the SIM component in accordance with the ISO 7816 standard.

A further embodiment provides a method for operating a host device, including inserting a plug-in adapter, having a subscriber identity module (SIM) component disposed thereon, into a host receptacle of the host device and inserting a memory card into a memory receptacle on the plug-in adapter. After inserting the plug-in adapter and the memory card, communications are conveyed via the adapter and the memory card between the host device and the SIM component.

In yet another embodiment, a method for operating a host device includes receiving at a memory card, via a plug-in adapter in which the memory card is inserted, a message from the host device that is directed to a SIM component on the plug-in adapter, and conveying the message from the memory card to the SIM component on the plug-in adapter. The message may be transmitted from the host device in accordance with a first protocol, and conveying the message may include parsing and conveying the message from the memory card to the SIM component in accordance with a second protocol. In a disclosed embodiment the first protocol is an SD protocol, while the second protocol is an ISO 7816 protocol.

The present disclosure will be more fully understood from the following detailed description of the embodiments thereof, taken together with the drawings in which:

DETAILED DESCRIPTION OF EMBODIMENTS

Figure 1:
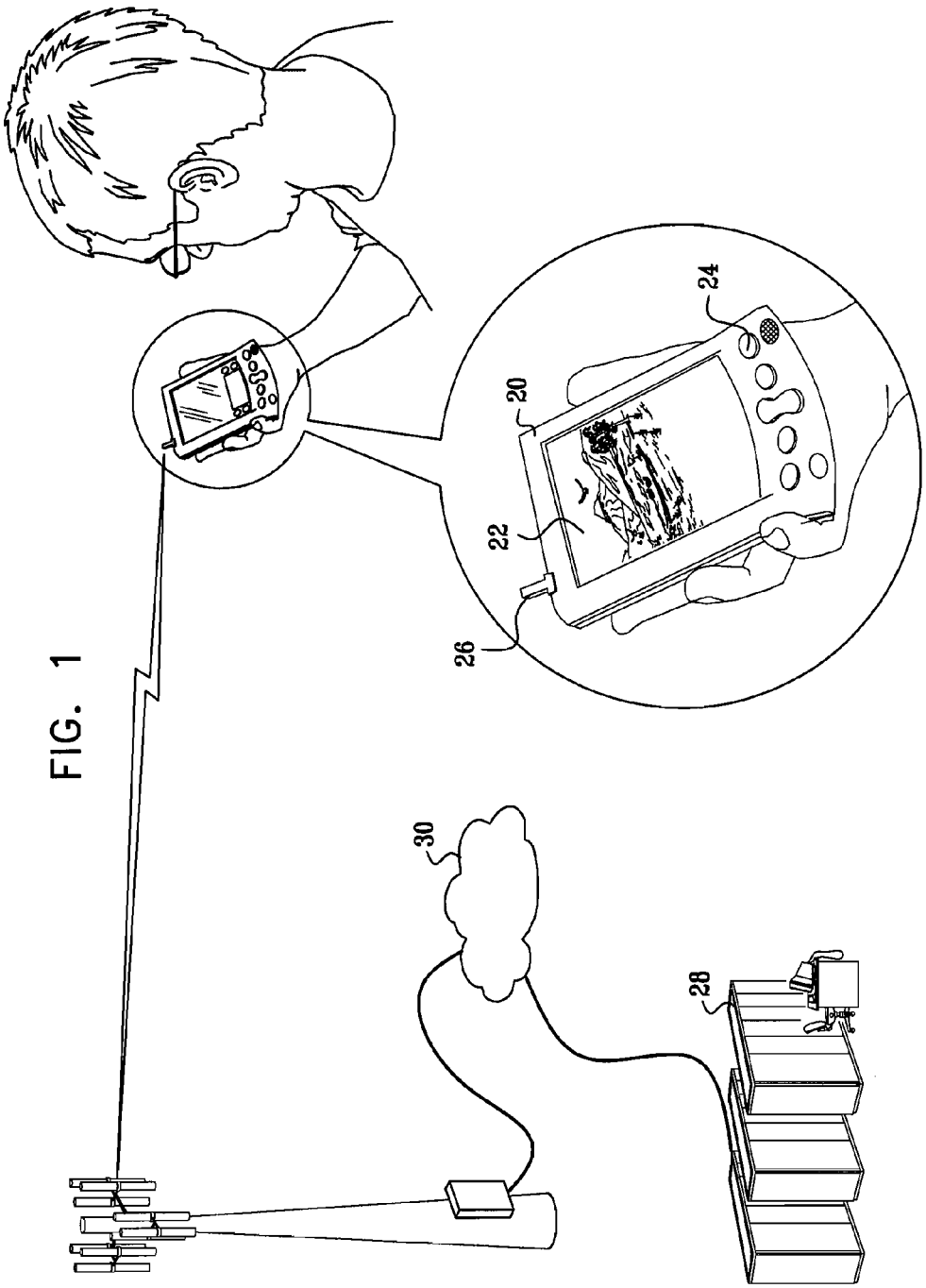
FIG. 1 is a schematic, pictorial illustration of a mobile computing device.

FIG. 1 is a schematic, pictorial illustration of a mobile computing device 20, having multimedia capabilities for receiving and playing digital content, such as video programs and music. For this purpose, device 20 contains a novel arrangement of digital memory and authentication components, as described with reference to the figures that follow. The device has an output interface, such as a video display 22 and audio speaker (not shown), as well as user controls 24 for selecting programs and performing other user control functions. The device also has a communication interface, represented by an antenna 26, for communicating with a network 30, such as a cellular or other mobile network or a satellite network. Alternatively or additionally, device 20 may communicate with a fixed network, such as a wired telephone, cable, or packet network.

Device 20 may be capable of playing content from different sources, including both content stored internally in the device memory and content transmitted over network 30 from a content provider 28. The content provider may charge a subscription fee or pay-per-view charge for each program that the user of device 20 chooses to view. To ensure that only authorized devices are capable of playing these programs, the content provider may use a conditional access system (CAS), which requires that device 20 contain a SIM component authorized by the content provider in order to authenticate the end user and enable it to decode the programs. (As noted above, the "SIM component" may be any sort of smart card or other suitable electronic device that contains a unique identifier.)

This sort of SIM-based authentication requirement can be problematic for some types of mobile devices. For example, assuming device 20 to be a mobile telephone, the device will typically contain a SIM component provided by the operator of network 30 and will not have an additional SIM receptacle available for the CAS of the content provider. Although it would be possible, in principle, to use the same SIM component for both purposes, this solution requires close cooperation between the mobile network operator and the content provider, which is not always practical. The user could switch the mobile network SIM and CAS SIM components back and forth for communication and media playing, but this solution is also impractical. In other cases, assuming device 20 to be a portable media player without telephony capabilities, for example, the device may not have a SIM receptacle at all.

On the other hand, current mobile devices do generally have a memory receptacle available, such as an SD card slot. In the embodiments described hereinbelow, a novel adapter is inserted into this memory receptacle, in a way that makes it possible for the receptacle to be used for both device memory and SIM authentication. Specifically, the adapter contains a SIM component (which may be embedded or removable) and a receptacle for a memory card (such as a microSD card). Circuitry in the adapter creates a communication path between the host device and the memory card and between the memory card and the SIM component. Thus, the host device can carry out both memory operations and SIM authentication operations via the adapter and the embedded processor of the memory card. Device 20 can be used in this manner both for receiving and playing programs on line from content provider 28, using a suitable CAS SIM in the adapter for authentication, and playing prerecorded programs that are stored in the memory.

Figure 2:
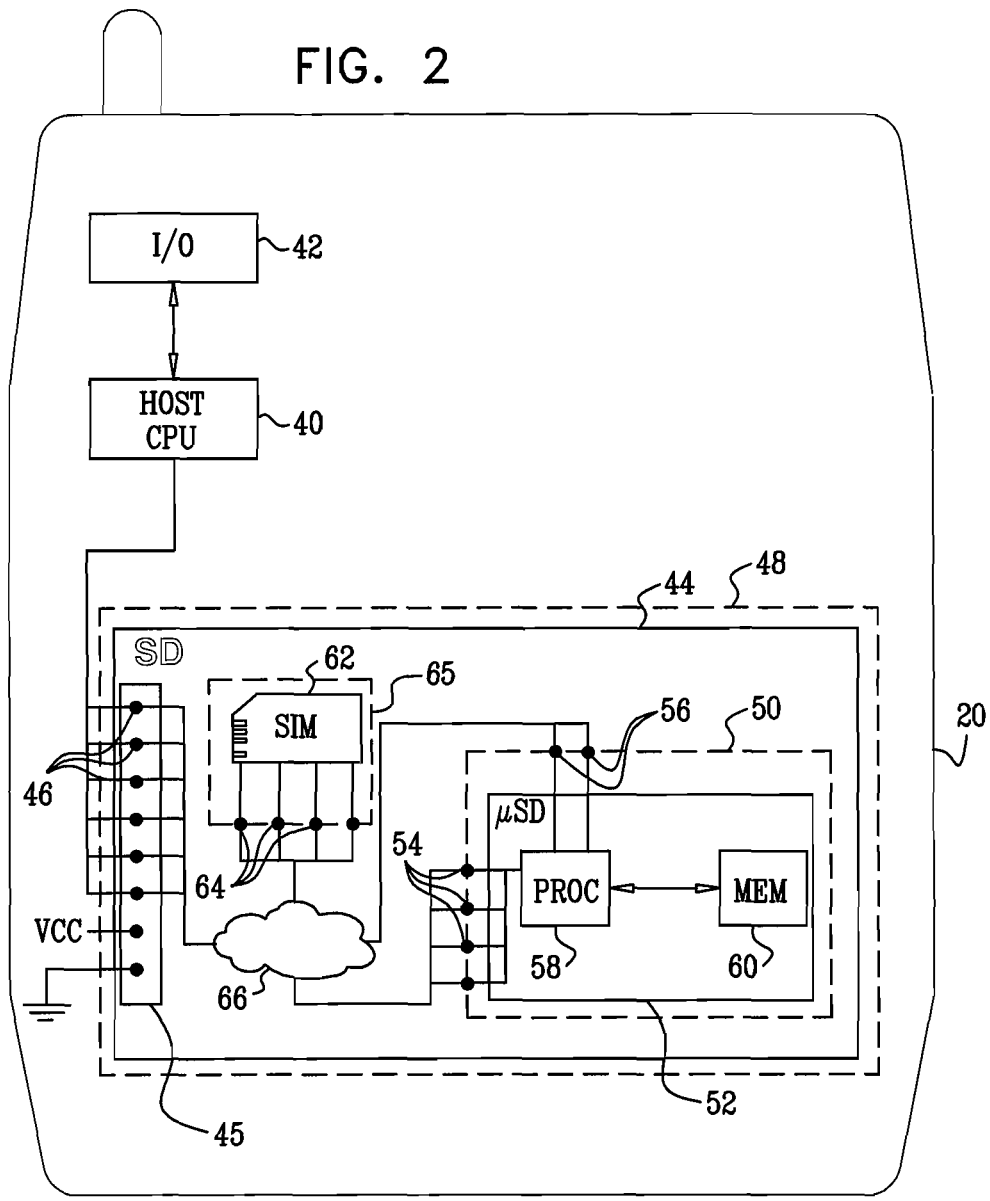
FIG. 2 is a block diagram showing components of a computing device.

FIG. 2 is a block diagram that schematically shows internal details and components of device 20, in accordance with one possible embodiment. Operations of the device are controlled by a host central processing unit (CPU) 40, with input/output (I/O) interfaces 42 for communicating with network 30 and for interacting with display 22 and controls 24 (FIG. 1). As noted above, device 20 may comprise a SIM card (not shown) provided by the operator of network 30 for authentication of the device on the network.

Device 20 comprises a host receptacle 48, which is designed to receive a standard memory card. In the present embodiment, the receptacle is assumed to be SD-compatible, but the principles of the present disclosure may similarly be applied using other memory card standards. An adapter 44 comprises a substrate with a connector 45, which plugs into receptacle 48. The connector contains contacts 46 that connect the adapter via the receptacle to the host device. The term "contacts," in the context of the present patent application and in the claims, refers to physical connection points, which may comprise, for example (without limitation), pins, pads or sockets.

Adapter 44 contains a memory receptacle 50 for receiving a memory card 52, such as a microSD card in the present example. Receptacle 50 comprises contacts 54, 56 which connect to a suitable connector on the memory card. Memory card 52 comprises an embedded processor 58 and a memory 60, such as a flash memory array. Memory 60 is typically used for storing both data (such as video recordings) for the host device and firmware to be run by the embedded processor.

Adapter 44 also holds a SIM component 62, which connects to contacts 64 on the adapter. Typically, the SIM component is configured to communicate in accordance with a predetermined standard, such as ISO 7816. The SIM component may be embedded in the adapter and fixedly connected to contacts 64. Alternatively, adapter 44 may comprise a SIM receptacle 65 containing contacts 64, into which the SIM component may be inserted and removed as desired.

Figure 4:
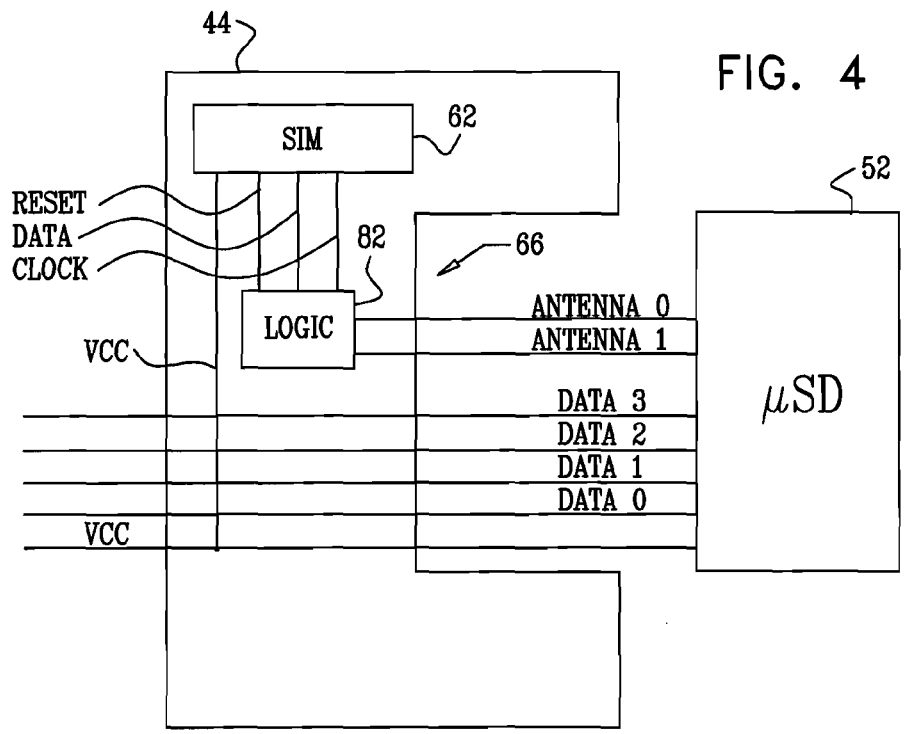
FIG. 4 is a block diagram that schematically illustrates a plug-in adapter and memory card.
Figure 5:
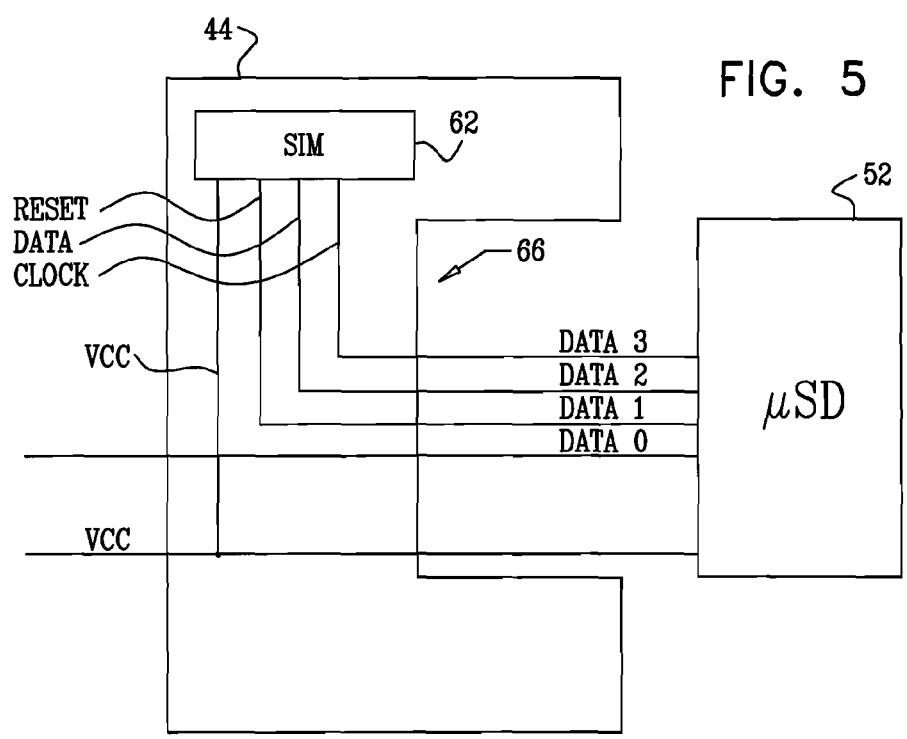
FIG. 5 is a block diagram that schematically illustrates a plug-in adapter and memory card in an alternative configuration.

Circuitry 66 on adapter 44 interconnects contacts 46, 54, 56 and 64 so as to enable host CPU 40 to communicate with SIM component 62. The flow of communications is described hereinbelow with reference to FIG. 3, while different possible configurations of circuitry 66 are shown in FIGS. 4 and 5. Generally speaking, circuitry 66 may simply comprise conductive paths between the appropriate contacts, with little or no added switching or other logic. In the embodiments that are described herein, there is no need for an embedded processor in adapter 44 to parse and execute messages from host CPU 40, since these functions are carried out by processor 58 in memory card 52.

Memory card 52 may be a standard product, comprising off-shelf hardware, with firmware modified as necessary to carry out the novel functions that are described herein. In one embodiment (described below in greater detail with reference to FIG. 4), memory card 52 has input/output pins for communicating with a Near Field Communication (NFC) antenna. These pins connect to contacts 56 in receptacle 50, while contacts 54 are used for the data connections between the memory card and the host device. Instead of connecting to an antenna, however, contacts 56 are used in this embodiment to connect processor 58 to SIM component 62, and the firmware run by the processor is modified in order to use the antenna pins for sending and receiving SIM messages.

Figure 3:
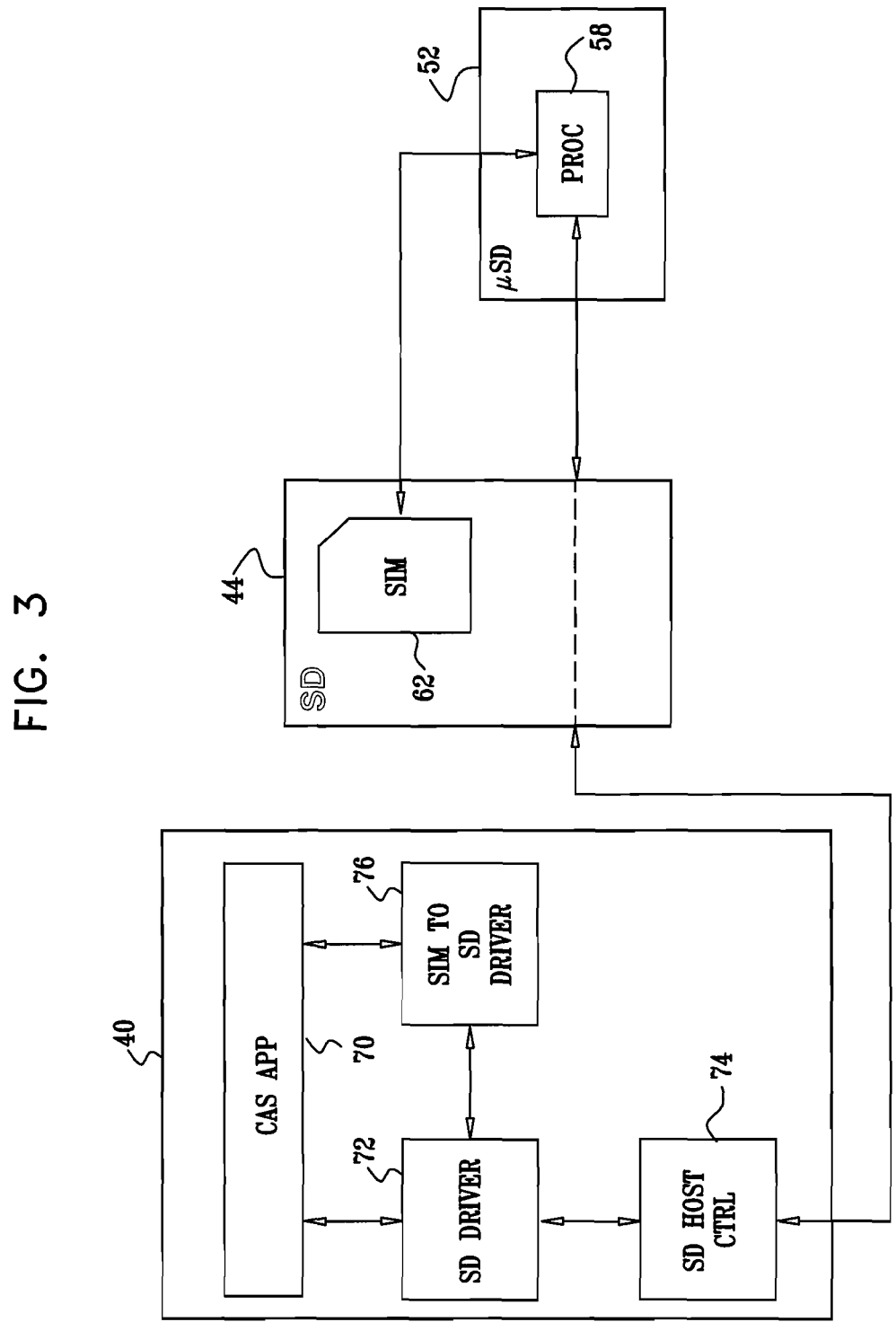
FIG. 3 is a block diagram that schematically illustrates communication flow among elements of a computing device.

FIG. 3 is a block diagram that schematically illustrates communication flow among elements of device 20 in an embodiment relating to receiving and playing content from content provider 28. This content is subject to the CAS of the content provider and is accessed by device 20 using a CAS application program 70 running on host CPU 40. To authenticate device 20 and decode the content, CAS application 70 accesses SIM component 62 via a communication path that passes through adapter 44 to memory card 52, and from the memory card back through the adapter to the SIM component, as shown in the figure. The term "path," in the context of the present patent application and the claims, may refer to any sort of physical or logical connection between endpoints (or a combination of physical and logical connections). Such a path typically terminates on and/or passes through the types of contacts that are defined above.

Host CPU 40 communicates with processor 58 on memory card 52 using a standard memory bus protocol, such as the SD protocol. For this purpose, an SD driver program 72 generates the appropriate memory commands and parses responses returned from the memory card. These commands and responses are passed through transparently by adapter 44. An SD host control program 74 is responsible for link control between the host device and memory card.

SIM component 62, however, communicates using a SIM protocol, such as ISO 7816, not the memory bus protocol that is used between the host device and memory card 52. To support communication with the SIM component, the host CPU uses a SIM-to-SD driver program 76. This program encapsulates outgoing SIM messages from CAS application 70 in commands that are compatible with the SD protocol and parses responses from the memory card in order to extract and interpret the incoming SIM messages from the SIM component, which it then passes to the CAS application. This encapsulation enables the CAS application to communicate with the SIM component without exporting a SIM protocol interface. In memory card 52, processor 58 performs similar encapsulation and parsing functions in order to convey the SIM messages to and from SIM component 62.

To this end, device 20 may utilize existing methods for encapsulating SIM messages in a memory bus protocol. Such methods are described, for example, in U.S. Patent Application Publication 2004/0064612 and in U.S. Pat. No. 7,305,535, whose disclosures are incorporated herein by reference, and may be adapted for use in the present embodiment. Although the present embodiment relates specifically to encapsulation of ISO 7816 messages in the SD protocol, similar principles may be used in transmitting other types of SIM protocol messages, as well as in encapsulating SIM messages in other memory bus protocols.

FIGS. 4 and 5 are block diagrams schematically show two different possible implementations of circuitry 66 in device 20.

In the embodiment of FIG. 4, in accordance with the SD protocol, memory card 52 exchanges four-bit data with the host device via adapter 44 using SD data lines that are labeled DATA 0 . . . DATA 3. The SD standard provides only these four data lines. Therefore, to communicate with SIM component 62, the processor in memory card 52 is programmed to use two additional pins, labeled ANTENNA 0 and ANTENNA 1, which are conventionally used for communicating with a NFC antenna, as explained above.

In accordance with ISO 7816, SIM component 62 has pins for VCC (power), clock, data and reset, as shown in FIG. 4. VCC is provided directly from the host device via adapter 44. Memory card 52 normally provides the standard clock and data signals to the SIM component via ANTENNA 0 and ANTENNA 1. When it is necessary to reset the SIM component, the memory card provides a reset command in the form of a special sequence of pulses over the clock and data lines. A simple logic circuit 82 in circuitry 66 detects this sequence and asserts the reset input to the SIM component. Logic circuit 82 may comprise, for example, a state machine, a microprocessor, or a programmable or hard-wired controller, which is configured to activate the reset of SIM component 62 in response to the command from the memory card. Thus, the requirements of the standard ISO 7816 interface to the SIM component are satisfied.

FIG. 5 is a block diagram that schematically shows details of circuitry 66, in accordance with an alternative embodiment. This embodiment takes advantage of an optional one-bit data mode provided by the SD standard. In this case, only the DATA 0 line is needed to convey data between the host device and memory card 52. The remaining SD data lines—DATA 1, DATA 2 and DATA 3—are available to convey the clock, data and reset signals between the memory card and SIM component 62. Thus, in this embodiment, circuitry 66 need comprise no more than suitable conductive traces on the substrate of adapter 44, and there is no need for logic circuit 82.

It will be appreciated that the embodiments described above are cited by way of example, and that the present disclosure is not limited to what has been particularly shown and described hereinabove. Rather, the scope of the present disclosure includes both combinations and subcombinations of the various features described hereinabove, as well as variations and modifications thereof which would occur to persons skilled in the art upon reading the foregoing description and which are not disclosed in the prior art.

The invention claimed is:

1. A method performed in a plug-in adapter, the method comprising:
    performing the following in a plug-in adapter having a first contact for connection to a host device, at least two second contacts for connection to a memory card, wherein the memory card stores encoded content, and a third contact for connection to a subscriber identity module (SIM) component storing a unique identifier:
    creating a communication path between the host device and the SIM component via the memory card by connecting at least one of the second contacts to the third contact and connecting at least another of the second contacts to the first contact; and
    conveying communications between the host device and the SIM component via the memory card, wherein the communications to the SIM component are encapsulated in commands that are compatible with the memory card's protocol, wherein an embedded processor of the memory card parses out the communications from the commands, and wherein the communications comprise a request to authenticate the host device based on the unique identifier and to decode the encoded content stored in the memory card.

2. The method according to claim 1, wherein conveying the communications comprises transmitting messages between the host device and the SIM component via the memory card in accordance with an ISO 7816 standard.

3. The method according to claim 1, wherein the at least one of the second contacts connects to an antenna connection of the memory card.

4. The method according to claim 1, wherein the plug-in adaptor is configured to connect to a host receptacle that is compatible with an SD card standard.

5. The method according to claim 1, wherein the plug-in adaptor is configured to be removablely connectable with the host device.

6. The method according to claim 1 further comprising a memory receptacle containing the second contacts, wherein the memory receptacle is compatible with a microSD card standard.

7. The method according to claim 1, wherein the memory protocol is an SD protocol.

8. The method according to claim 1, wherein the host does not have a SIM component receptacle.

9. The method according to claim 1, wherein the host has only one SIM component receptacle but that receptacle is used for a different SIM component.

* * * * *